United States Patent
Recalde

(10) Patent No.: US 12,295,377 B2
(45) Date of Patent: May 13, 2025

(54) APPARATUS FOR USE DURING SOUS VIDE COOKING METHOD

(71) Applicant: Ramon Alberto Recalde, Millstone Township, NJ (US)

(72) Inventor: Ramon Alberto Recalde, Millstone Township, NJ (US)

(*) Notice: Subject to any disclaimer, the term of this patent is extended or adjusted under 35 U.S.C. 154(b) by 549 days.

(21) Appl. No.: 17/646,083

(22) Filed: Dec. 27, 2021

(65) Prior Publication Data

US 2022/0330559 A1 Oct. 20, 2022

Related U.S. Application Data

(60) Provisional application No. 63/177,035, filed on Apr. 20, 2021.

(51) Int. Cl.
*A47J 43/20* (2006.01)
*A22C 7/00* (2006.01)

(52) U.S. Cl.
CPC ............ *A22C 7/0076* (2013.01); *A47J 43/20* (2013.01)

(58) Field of Classification Search
CPC ........ A22C 7/0076; A21B 3/137; A47J 43/20; A47J 36/16; A47J 27/04; A47J 37/06
USPC .......... 99/393, 416, 422, 426, 495; 426/392, 426/438, 503, 513
See application file for complete search history.

(56) References Cited

U.S. PATENT DOCUMENTS

2016/0015042 A1* 1/2016 Allen .................. A21B 3/137
426/503

OTHER PUBLICATIONS

Amazon. "Brand: Sunrise Kitchen Supply: Round Cake Mold/ Pastry Ring, S/S, Heavy Gauge. (5"×1.75")" https://www.amazon.com/Round-Cake-Pastry-Heavy-Gauge/dp/B01IPDKM42/ref=sr_1_15?hvadid=3525374899&hvbmt=be&hvdev=c&hvqmt=e&keywords=hamburger+rings&qid=1638685630&sr=8-15.
EBay. "4 PCS Stainless Steel Mousse Ring Cake Mold Household DIY Burger Bread Baking Mo" https://www.ebay.com/itm/223622072243?hash=item3410ea07b3:g:qCoAAOSwoptdUnk-.
EBay. "VTG Tupperware 882/884 Hamburger Patty Ring & Press 6 Keepers 1 Lid Freezer Safe" https://www.ebay.com/itm/334237955934?hash=item4dd222775e:g:A6EAAOSwMGFhpqUv.

* cited by examiner

*Primary Examiner* — Phuong T Nguyen

(57) ABSTRACT

A mold for shaping into a patty a ground material to be cooked using a sous vide cooking process. In one embodiment, the mold is adapted to be (i) inserted into packaging for sous vide cooking with the ground material therein and (ii) maintained in the packaging throughout the sous vide cooking process. Another embodiment includes a mold for shaping and holding a shape of a patty of a ground material inserted within the mold that is to be cooked using a sous vide cooking process, the mold having a shape, the mold with the ground material inside therein being within a packaging inserted into a sous vide water bath that is being heated by a sous vide immersion circulator, and wherein the mold maintains its own shape and the shape of the patty during the sous vide cooking process.

2 Claims, 5 Drawing Sheets

APPARATUS FOR USE DURING SOUS VIDE COOKING METHOD

CROSS-REFERENCE TO RELATED APPLICATIONS

This application claims benefit of U.S. provisional patent application Ser. No. 63/177,035 filed Apr. 20, 2021, which is incorporated by reference as if fully set forth herein.

TECHNICAL FIELD

The present invention relates to cooking using the sous vide cooking method.

BACKGROUND

Sous vide cooking is an increasingly popular method of cooking. The result of cooking food using the sous vide cooking method is food that is exceptionally tender and flavorful. In addition, the results of cooking using the sous vide method is, typically, consistent. In contrast to traditional cooking, where high temperature energy is used to cook food from the outside until the interior of the food reaches a preferred temperature, the sous vide method cooks the food at a lower controlled temperature for longer periods of time. Thus, food cooked using the sous vide method is much less vulnerable to drying out, under-cooking, over-cooking or burning. That is because this slower cooking method yields an equally even and consistent temperature throughout the food, i.e., from its outside to its inside.

The method involves placing the food to be cooked in sealed air-tight pouches or bags, which may, or may not, be vacuum sealed. The food may be seasoned with spices or marinades before being placed in the bag or couch. The bag or pouch, which may be vacuumed sealed, is then submerged in a container or pot of pre-heated water fixed temperature by a cooking apparatus knows as sous vide machine, sous vide cooker, sous vide immersion circulator, etc. The food being cooked using the sous vide method is never in direct contact with the water.

The sous vide machine provides for at least the accurate control of temperature during the cooking process. It may also provide for control of the time of cooking. For example, if the desired temperature for a medium-rare steak, the water can be constantly maintained at a controlled temperature of about 132 degrees Fahrenheit, i.e., 55.5 degrees Celsius, for a predetermined time which will result in bringing the internal and external temperature of the food to the same temperature as the water for substantially the specified time.

In recent years the sous vide cooking method popularity has shown an upward trend that is seen in the growth of sales equipment for use in sous vide cooking, such as sous vide immersion circulators and vacuum sealers, as well as the appearance of numerous forums and social media platforms for sous vide aficionados around the world. However, a problem with the sous vide method relates to hamburgers or other patties that are made of ground or chopped material. While generally the discussion hereinbelow will relate to hamburgers formed of chopped or ground meat, such is not intended to be limiting but rather it will be recognized that the patties may be made of or include other materials aside from not only all types of meat and fowl but also, for example, may be made from fish, including shellfish such as crab and lobster, vegetables, spices, and so forth as well as combinations thereof. It should also be recognized that in parts of the world ground or chopped meat, which is used for making hamburgers, is often called mince meat and such should be considered when reference herein is made to chopped, ground, or hamburger meat.

More specifically, currently an individual making hamburger patties to be cooked using the sous vide method first manually forms the patty or employs a mold to do same and then places the formed hamburger patty on its own, i.e., out of any mold that might have been used to form the patty, in an airtight bag, pouch, or vacuum sealed pouch. Disadvantageously, when the patty is placed inside a bag to be sous vide cooked, it tends to distort in shape. This may be due to the manipulation of the patty as well as a result of the air pressure on the bag once some of the air is removed, especially when the bag is at least partly vacuum sealed. For example, when vacuum sealing the bag there is a tendency for the bag to squash the patty due to the removal of its air which results in a distortion of the bag's shape that puts pressure on the bag's contents. Thus, the results are disappointing as these bags or pouches yield an inconsistent, i.e., not uniform, deformed cooked burger due to the manipulation and airtight pressure of sealed bag. Disappointingly, a well-shaped and cooked hamburger has not heretofore been achievable using the sous vide cooking method.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include a mold for shaping into a patty a ground material to be cooked using a sous vide cooking process. The mold is adapted to be (i) inserted into packaging for sous vide cooking with the ground material therein and (ii) maintained in the packaging throughout the sous vide cooking process.

Some embodiments disclosed herein include a mold for shaping and holding a shape of a patty of a ground material inserted within the mold that is to be cooked using a sous vide cooking process, the mold having a shape, the mold with the ground material inside therein being within a packaging inserted into a sous vide water bath that is being heated by a sous vide immersion circulator, and wherein the mold maintains its own shape and the shape of the patty during the sous vide cooking process.

DETAILED DESCRIPTION

Figure 1:
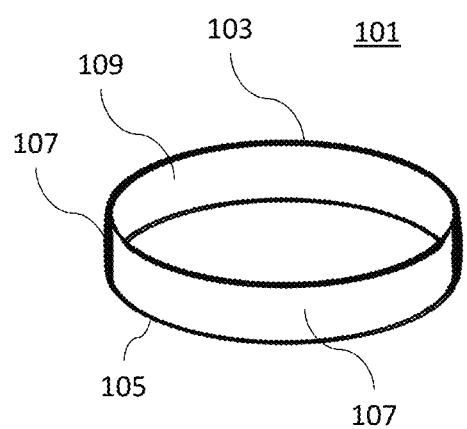
FIG. 1 shows an illustrative mold that is designed enable repeated production of consistently well-shaped patties that have are cooked using the sous vide cooking method.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views. Moreover, steps which are listed in sequential fashion may and often are preferably performed in parallel.

The disclosure is generally directed to users of the sous vide cooking method and more specifically, to facilitate the preparation, molding and cooking of patties, e.g., hamburgers, with the sous vide cooking method so that a consistently well-shaped patty is repeatedly produced. More specifically, I have recognized that a properly shaped mold made out of a suitable material such that the ring mold can be included in the bag or pouch while still containing the hamburger patty can overcome various problems with producing a perfectly shaped and cooked hamburger using the sous vide cooking method. In one embodiment, the mold is ring-shaped. The disclosed ring-shaped mold advantageously molds and maintain an even round shape and thickness for the patty during the sous vide cooking method of the hamburger. The ring-shaped mold guarantees the consistency in shape without the risk of deforming the meat patty in the process of making an airtight closure or vacuum sealing the pouch. The resulting patties are disk-shaped and have a diameter that is substantially the same as the inside diameter of the ring-shaped mold. The ring-shaped mold also is designed to avoid puncturing of the bag or pouch, thus ensuring that water does not leak into the bag or pouch during sous vide cooking.

Thus, use of the disclosed mold avoids various problems of prior art solutions given that such prior art solutions may: 1) affect consistency and equal shape and thickness of each patty; 2) affect heat temperature resistance and durability; 3) be constructed of materials that do not meet the relevant standards or guidelines for direct food contact safety especially with heating of food; and 4) puncture or pierce the pouch, bag, or airtight vacuum sealed bag while the patty is being enclosed and/or during the cooking process, such puncture or piercing being easily causable by a sharp or rough edge.

FIG. 1 shows illustrative mold 101 that is designed enable repeated production of consistently well-shaped patties that have are cooked using the sous vide cooking method. Mold 101 is ring-shaped and is formed of a substantially rigid wall that is sufficiently strong so as to not deform when a pouch or bag in which they are inserted has the air therein extracted by a vacuum process. The material or materials from which mold 101 is formed should be certified by NSF as safe for direct contact with food during cooking over the range of temperatures of sous vide cooking. In one embodiment, a wall thickness of 4.5 mm of food grade plastic, e.g., polypropylene (PP), also known as plastic number 5, or stainless steel provides sufficient strength to prevent flexibility of the mold and allow it to withstand the forces brought to bear on it during the vacuum sealing and sous vide cooking.

In one embodiment suitable for making a one half pound patty, mold 101 has an inside diameter of about 4.25 inches or 108 mm and a height of about 1 inch or 25.4 mm. In another embodiment suitable for making a one third pound patty, mold 101 has an inside diameter of about 4.25 inches or 108 mm and a height of about 0.75 inch or 19.0 mm. In yet a further embodiment suitable for making a one quarter pound patty, mold 101 has an inside diameter of about 4.25 inches or 108 mm and a height of about 0.50 inch or 12.7 mm. The aforementioned embodiments all have the same inside diameter so as to be suitable for use with a "standard" bun. However, such is not a limitation and those of ordinary skill in the art will be easily able to make embodiments of mold 101 with different diameters of their choosing.

In order to prevent puncturing or piercing of the bag into which mold 101 are inserted for use in sous vide cooking of ground meat contained therein, mold 101 should have no sharp edges. To this end, mold 101 as shown in FIG. 1 has rounded edges on the top and bottom and the exterior surface also has a curved profile. FIG. 1 shows rounded top edges 103, rounded bottom edges 105, and curved exterior surface 107 of mold 101. Interior surface 109 of mold 101 is preferably flat, so as to facilitate removal of the patty after cooking and to facilitate cleaning.

Figure 2:
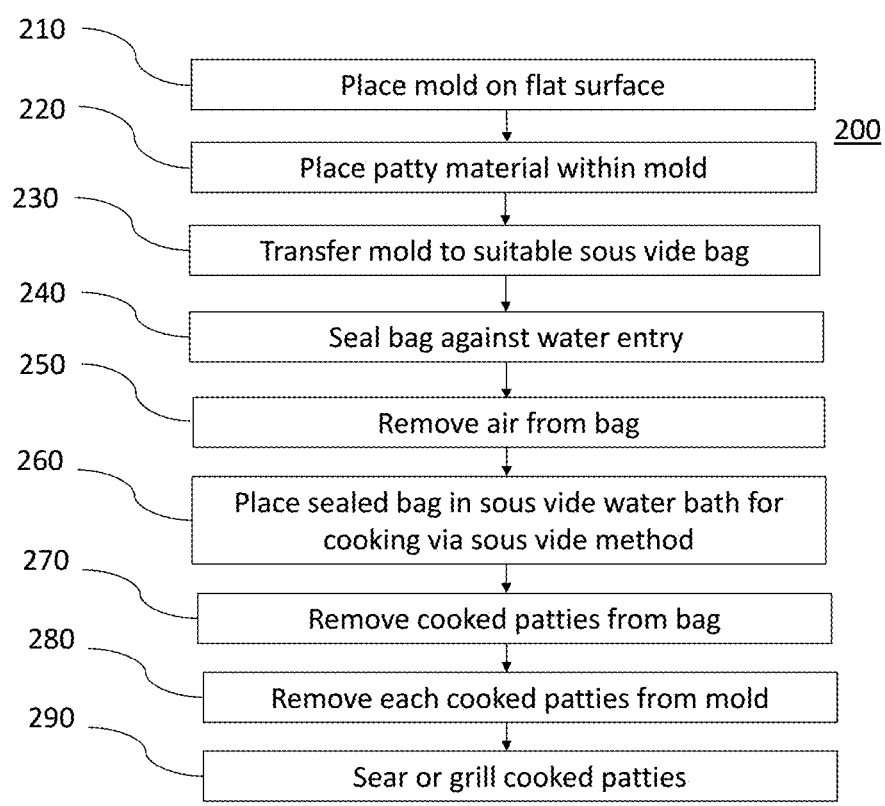
FIG. 2 shows an illustrative process for preparing a patty for sous vide cooking using the mold of FIG. 1.

Mold 101 may be used to prepare a patty for sous vide cooking using illustrative process 200 shown in the flowchart of FIG. 2 as follows.

Figure 3:
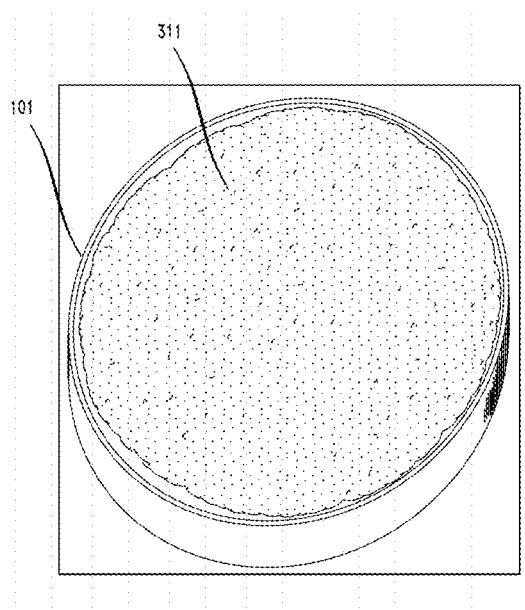
FIG. 3 shows uncooked chopped meat filling the mold of FIG. 1.
Figure 4:
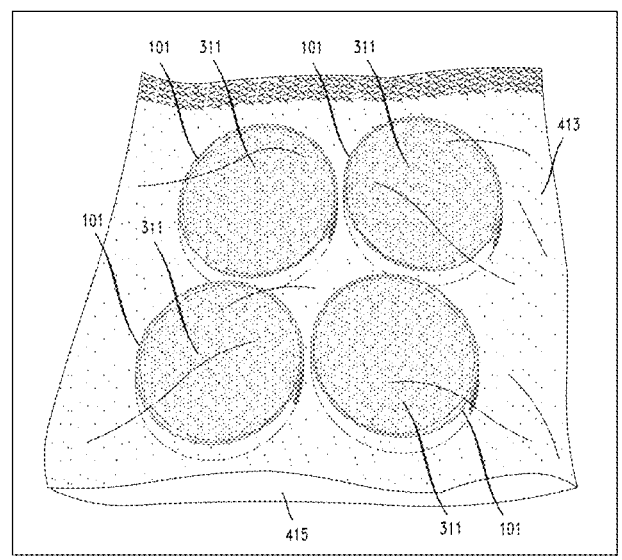
FIG. 4 shows molds with the patty material therein inside of a yet opened bag or pouch suitable for use in sous vide cooking.

First, in step 210, mold 101 is placed on a flat surface. Next, in step 220, the raw material for the patty, e.g., uncooked chopped meat, is placed within mold 101 and formed to fill mold 101, e.g., as shown in FIG. 3. More specifically, FIG. 3 shows uncooked chopped meat 311 filling mold 101. Thereafter, in step 230, mold 101 with the patty material therein is transferred to a bag or pouch suitable for use in sous vide cooking, e.g., as shown in FIG. 4, which shows four molds 101 with patty material 311 therein inside of bag 413. This may be done by way of end 415 which, as seen in FIG. 4, is open at this time. When more than one mold 101 is placed within the sealable bag or pouch, it is preferably done in a one layer arrangement, i.e., the patties are not stacked one on top of another.

Figure 5:
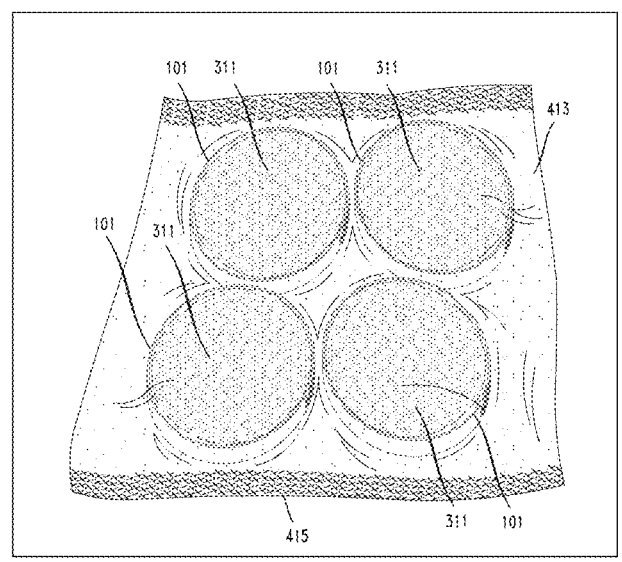
FIG. 5 shows the bag of FIG. 4 now vacuum sealed with four molds filled with raw patty material therein.

After any mold 101 with the raw material inside is placed in the bag, the bag is sealed, e.g., by sealing end 415, to prevent water entry in step 240. Prior to sealing or thereafter, depending on the nature of the bag or pouch, at the user's choice, air is removed from the bag or pouch in step 250 so that any mold 101 within the bag or pouch are vacuumed sealed therein. Advantageously, because of the use of molds 101, the patties maintain their shape even under the pressure that is applied to them due to the removal of the air. Bag 413, now vacuum sealed with four molds 101 filled with raw patty material 311, is shown in FIG. 5. The vacuum sealed bag or pouch is then place in the water bath with a sous vide immersion circulator for cooking using the sous vide method in step 260.

After cooking, the cooked patties within mold 101 may be removed from the bag or pouch in step 270. Then, in step 280, each patty may be removed from its respective mold 101. Advantageously, it will be seen that the patties maintained their shape and height, thus overcoming the problems of the prior art. After removal from mold 101, the patties may then be seared or grilled in optional step 290 as is often done with food cooked using the sous vide method.

Although mold 101 has been described as being round or having a ring-like shape, those of ordinary skill in the art will readily recognize that other shapes may be employed so long as the mold does not have any sharp edges.

It also will be recognized that the patties may be made of or include other materials aside from meat, e.g., fish including shellfish such as crab and lobster, vegetables, spices, and so forth.

The foregoing merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A mold for shaping into a patty a ground material to be cooked using a sous vide cooking process, the mold being adapted to be inserted into packaging for sous vide cooking with the ground material therein and maintained in the packaging throughout the sous vide cooking process;
   wherein the mold has a ring-shape;
   wherein mold has a diameter of 4.25 inches for the interior of the ring-shape and a height of the ring-shape of one of the group consisting of: 1 inch, 0.75 inch, and 0.5 inch;
   wherein the mold is made of one of the group consisting of: stainless steel and a food grade plastic;
   wherein at least one exterior surface of at least one wall of the mold has a curved shape; wherein top and bottom edges of at least one wall of the mold are rounded;
   wherein the mold has no sharp edges;
   wherein the mold is sufficiently rigid to maintain its own shape and to correspondingly maintain a shape of the ground material therein throughout the sous vide cooking process;
   wherein the mold has a wall thickness of about 4.5 mm; and
   wherein the sous vide cooking process includes at least partially vacuum sealing the packaging, inserting the bag into a water bath heatable by a sous vide immersion circulator, and heating the water for a period of time at least sufficient to cook the ground material.

2. A mold for shaping and holding a shape of a patty of a ground material inserted within the mold that is to be cooked using a sous vide cooking process, the mold having a shape, the mold with the ground material inside therein being within a packaging inserted into a sous vide water bath that is being heated by a sous vide immersion circulator, and wherein the mold maintains its own shape and the shape of the patty during the sous vide cooking process;
   wherein the packaging is vacuum sealed;
   wherein the packaging is one of the group consisting of: a bag and a pouch;
   wherein the mold is made of one of the group consisting of stainless steel and a food grade plastic;
   wherein at least one exterior surface of at least one wall of the mold has a curved shape;
   wherein top and bottom edges of at least one wall of the mold are rounded;
   wherein the mold has no sharp edges;
   wherein the mold is sufficiently rigid to maintain its own shape and to correspondingly maintain a shape of the ground material therein throughout the sous vide cooking process;
   wherein the mold has a ring-shape and the shape of the patty is disk-shaped;
   wherein mold has a diameter of 4.25 inches for the interior of the ring-shape and a height of the ring-shape of one of the group consisting of: 1 inch, 0.75 inch, and 0.5 inch and
   wherein the mold has a wall thickness of about 4.5 mm.

* * * * *